May 20, 1958    J. T. TIDWELL    2,835,067
STEPPED FISH LURE
Filed Dec. 22, 1955
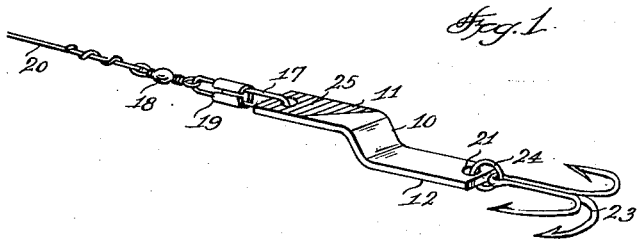
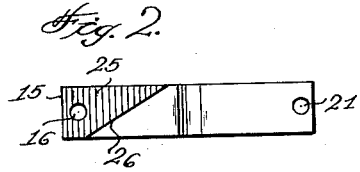
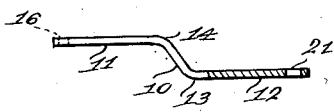
INVENTOR.
JUEL T. TIDWELL
BY *Victor J. Evans & Co.*
ATTORNEYS

United States Patent Office 2,835,067
Patented May 20, 1958

2,835,067
STEPPED FISH LURE
Juel T. Tidwell, Lubbock, Tex.

Application December 22, 1955, Serial No. 554,680

1 Claim. (Cl. 43—42.5)

This invention relates to fish lures of the type having a step or offset in the intermediate part with means for attaching a swivel for a connection to a fishing line at one end and with the multiple hook attached to the opposite end.

The purpose of this invention is to provide an improved fishing lure in which the leading portion of the lure is positioned in a plane spaced above the trailing portion and in which the leading and trailing portions are connected with a step providing a definite break between the two portions, whereby in retrieving the lure which has a tendency to move laterally in the water, the lure spins in a clockwise direction as it moves toward the right side and in a counter clockwise direction as it moves toward the left side.

Fishing lures have been provided in various types and designs and numerous attempts have been made to improve the action of a lure in the water, however, with conventional types of lures which are formed with arcuate body portions the lure travels with a streamline movement, the curved portion coacting with the water and traveling through the water with a slow easy movement. With this thought in mind this invention contemplates a lure formed with sections having flat surfaces whereby instead of gliding through the water with a slow easy movement the lure goes into a spinning action in retrieving, assuming a frantic darting and side slipping motion, thus creating an appealing action continuously as it is retrieved, and assuming a spinning action as it sinks upon termination of the retrieving action.

The object of this invention is, therefore, to provide means for forming a fishing lure wherein the lure is actuated with a stepped action as it is drawn through the water creating turbulence and being particularly attractive to certain types of fish.

Another object of the invention is to provide means for forming an improved fish lure of a flat piece of material.

A further object of the invention is to provide an improved fish lure which is of a simple and economical construction.

With these and other objects and advantages in view the invention embodies a bar or plate having an upper flat section, a lower flat section and an inclined intermediate or connecting section, the lower flat section being positioned in a plane parallel to and spaced below the upper or leading flat section and the extended ends of the sections being provided with openings for hooks and fishing line attachments.

Other features and advantages of the invention will appear from the following description taken in connection with the drawing, wherein:

Figure 1 is a perspective view showing the improved stepped fishing lure in a position in which it is used with a fishing line attached by a swivel to the forward end and with gang hooks extended from the trailing or rear end.

Figure 2 is a plan view of the lure with the hooks and swivel omitted and showing a diagonally disposed line defining a red portion on the leading end.

Figure 3 is a side elevation of the lure, part of the trailing portion thereof being broken away and shown in section.

Referring now to the drawing wherein like reference characters denote corresponding parts, the improved stepped fishing lure of this invention includes a plate bent to provide an inclined section 10 at the center with a horizontally disposed leading end 11 and having a trailing end 12 positioned in a plane parallel to and spaced from a plane extended through the leading section 11. The leading end of the section 12 is extended upwardly from a point 13 to a point 14 providing the section 10 and from the point 14 the plate 11 extends forwardly to the end 15 of the lure.

The leading end of the section 11 is provided with an opening 16 for a loop 17 of a swivel 18, the swivel being connected to the loop with a connector 19 and a line 20 being connected to the swivel.

The trailing end of the section 12 is provided with an opening 21 in which the eye of a gang hook 23 is held by a split ring 24.

The forward portion of the leading section 11 is colored red, as indicated by the numeral 25, the colored portion, which is defined by the line 26 being provided on both the upper and lower surfaces of the section 11.

With the lure formed and assembled as illustrated and described the body will assume a spinning action as it is retrieved and in addition will assume a lateral motion traveling first to one side and then to the other and as it moves to the right it will spin in a clockwise direction, and as it moves to the left it will spin in a counter clockwise direction.

By this means a fishing lure is provided that assumes a frantic darting and side slipping motion as it is drawn through the water in retrieving, and when the retrieving action is terminated the lure will spin as it drops downwardly in the water.

It will be understood that modifications, within the scope of the appended claims, may be made in the designing and arrangement of the parts without departing from the spirit of the invention.

What is claimed is:

As a new article of manufacture, a fishing lure fabricated of a single rectangular piece of sheet material shaped to include an elongated bar having an inclined intermediate section providing leading and trailing sections, the intermediate section being of rectangular configuration in plan, said leading and trailing sections each having a circular opening spaced inwardly from the end thereof, the rear edge of the leading section being disposed forwardly of the front edge of the trailing section, the opening in the leading section being connected to a fishing line, and the opening in the trailing section being connected to a fish hook, said leading and trailing sections being positioned in spaced parallel horizontal planes, said leading section being provided on both upper and lower surfaces with a brightly colored area which extends from the leading end to a point contiguous to the inclined section, said colored areas also including a rearwardly disposed inclined edge, said leading and trailing sections being of the same size and each including spaced parallel side edges and spaced parallel end edges, the end edges being arranged at right angles to the longitudinal axis of the lure, the side edges of the leading and trailing sections being straight and lying in the same corresponding planes.

References Cited in the file of this patent
UNITED STATES PATENTS

| | | |
|---|---|---|
| 1,638,215 | Rodgers | Aug. 9, 1927 |
| 1,883,695 | Goerke | Oct. 18, 1932 |
| 2,003,976 | Raymond | June 4, 1935 |
| 2,238,604 | Sabin | Apr. 15, 1941 |
| 2,608,787 | Krogue | Sept. 2, 1952 |